United States Patent
Tseng et al.

(10) Patent No.: US 9,796,388 B2
(45) Date of Patent: Oct. 24, 2017

(54) VEHICLE MODE DETERMINATION

(71) Applicant: Ford Global Technologies, LLC, Dearborn, MI (US)

(72) Inventors: Fling Tseng, Ann Arbor, MI (US); Dimitar Petrov Filev, Novi, MI (US); Johannes Geir Kristinsson, Ann Arbor, MI (US); Joseph Wisniewski, Royal Oak, MI (US); Shiqi Qiu, Canton, MI (US); Imad Hassan Makki, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/972,540

(22) Filed: Dec. 17, 2015

(65) Prior Publication Data

US 2017/0174215 A1    Jun. 22, 2017

(51) Int. Cl.
| | | |
|---|---|---|
| *B60W 30/182* | (2012.01) | |
| *B60W 10/04* | (2006.01) | |
| *B60W 10/18* | (2012.01) | |
| *B60W 10/20* | (2006.01) | |

(52) U.S. Cl.
CPC .......... *B60W 30/182* (2013.01); *B60W 10/04* (2013.01); *B60W 10/18* (2013.01); *B60W 10/20* (2013.01); *B60W 2520/00* (2013.01); *B60W 2550/141* (2013.01); *B60W 2550/22* (2013.01)

(58) Field of Classification Search
None
See application file for complete search history.

(56) References Cited

U.S. PATENT DOCUMENTS

| | | | |
|---|---|---|---|
| 6,026,346 A | 2/2000 | Ohashi et al. | |
| 6,591,172 B2* | 7/2003 | Oda | G05D 1/027 701/23 |
| 7,233,861 B2 | 6/2007 | Van Buer et al. | |
| 7,818,120 B2 | 10/2010 | Poreda et al. | |
| 8,392,112 B2 | 3/2013 | Bradburn et al. | |
| 8,442,758 B1 | 5/2013 | Rovik et al. | |
| 8,874,301 B1 | 10/2014 | Rao et al. | |
| 9,008,952 B2 | 4/2015 | Caskey et al. | |
| 9,188,985 B1* | 11/2015 | Hobbs | G01C 21/34 |
| 9,638,536 B2* | 5/2017 | Ono | G01C 21/3626 |
| 2008/0269956 A1 | 10/2008 | Dix et al. | |

(Continued)

FOREIGN PATENT DOCUMENTS

| | | |
|---|---|---|
| EP | 1462899 A1 | 9/2004 |
| JP | 2004125726 A * | 4/2004 |

(Continued)

OTHER PUBLICATIONS

Machine Translation of JP 2004125726.*

(Continued)

*Primary Examiner* — Navid Ziaeianmehdizadeh
(74) *Attorney, Agent, or Firm* — Frank A. MacKenzie; Bejin Bieneman PLC

(57) ABSTRACT

An operating mode is determined for a vehicle according to respective control states of each of a plurality of vehicle subsystems that include braking, steering, and propulsion. The operating mode is one of manual control, partial manual control, and no manual control. A route for the vehicle is determined based in part on the operating mode.

15 Claims, 3 Drawing Sheets

(56) References Cited

U.S. PATENT DOCUMENTS

| | | |
|---|---|---|
| 2010/0228427 A1 | 9/2010 | Anderson et al. |
| 2011/0210973 A1 | 9/2011 | Di Crescenzo et al. |
| 2012/0303222 A1 | 11/2012 | Cooprider et al. |
| 2012/0306663 A1 | 12/2012 | Mudalige |
| 2013/0151149 A1 | 6/2013 | Kristinsson et al. |
| 2013/0297140 A1 | 11/2013 | Montemerlo et al. |
| 2014/0032572 A1 | 1/2014 | Eustice et al. |
| 2014/0108307 A1 | 4/2014 | Raghunathan et al. |
| 2014/0358353 A1 | 12/2014 | Ibanez-Guzman et al. |
| 2015/0166069 A1 | 6/2015 | Engelman et al. |
| 2015/0170287 A1* | 6/2015 | Tirone ............... G06Q 40/08 705/4 |
| 2015/0192428 A1 | 7/2015 | Nemec et al. |
| 2015/0210272 A1* | 7/2015 | Edgren ............... G08B 6/00 701/23 |
| 2015/0330802 A1* | 11/2015 | Ono ............... B60W 50/14 701/431 |
| 2016/0033964 A1* | 2/2016 | Sato ............... B60K 28/06 701/24 |
| 2016/0041553 A1* | 2/2016 | Sato ............... B60W 30/143 701/23 |
| 2016/0167652 A1* | 6/2016 | Slusar ............... B60W 30/143 701/27 |
| 2016/0298976 A1* | 10/2016 | Sato ............... G08G 1/096827 |
| 2017/0102700 A1* | 4/2017 | Kozak ............... B60W 30/00 |

FOREIGN PATENT DOCUMENTS

| | | |
|---|---|---|
| WO | 2014029492 A1 | 2/2014 |
| WO | 2014139821 A1 | 9/2014 |
| WO | 2014191209 A1 | 12/2014 |

OTHER PUBLICATIONS

"Jaguar Land Rover Develops the Self-Learning Intelligent Car of the Future", http://newsroomjaguarlandrover.com/en-in/jlr-corp/news/2014/07/jlr_self_learning_car_090714/, 3 pages.
"Mitsubishi Electric Develops Predictive HMI for In-car Device Operation", Northville, MI, Mar. 5, 2014, Mitsubishi Electric, 3 pages.
"Toyota Brings Advanced Automated Vehicle Technology to U.S. Roads", Ann Arbor, MI, Sep. 4, 2014, © Toyota Motor Sales, U.S.A., Inc., 13 pages.
GB Search Report dated Jun. 14, 2017.

* cited by examiner

VEHICLE MODE DETERMINATION

BACKGROUND

Road design may involve considerations of vehicle density, speed, and the like. Further roads may be maintained (or not) in different ways, and/or may have characteristics (e.g., grade, curves, width, etc.) dictated by geographic and/or topographic features. Different roads, therefore, may have different characteristics.

DRAWINGS

DESCRIPTION

Introduction

Figure 1:
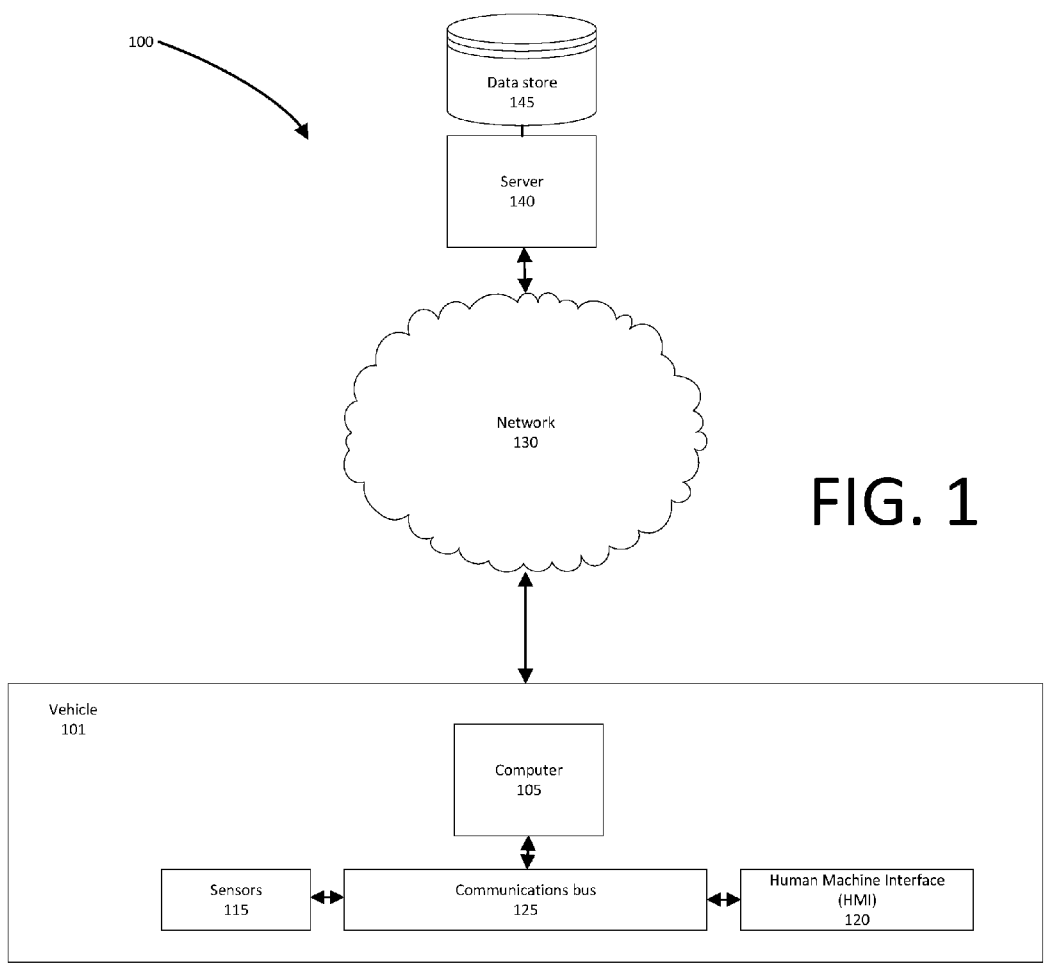
FIG. 1 illustrates an example vehicle system for determining a route based at least in part on a vehicle mode of operation and/or a vehicle mode of operation based at least in part on a route.

FIG. 1 is a block diagram of an example vehicle system 100. The vehicle 101 may include a computer 105 communicatively coupled to a communications bus 125, e.g., communicating with various vehicle 101 components such as electronic control units (ECUs) to receive data from and/or control vehicle 101 subsystems such as steering, brakes, propulsion, etc. The computer 105 may be connected to sensors 115 and a human machine interface (HMI) 120 through the communications bus 125. The computer 105 may communicate with other vehicles using a communications protocol such as is known, e.g., dedicated short range communications (DSRC), etc. The computer 105 may further receive and provide data relating to operating the vehicle 101 via the vehicle communications bus 125, and yet further may communicate via a network 130 with one or more remote servers 140. The server 140 typically includes or is communicatively coupled to a data store 145.

The vehicle 101 computer 105 may be programmed to determine a route and/or a mode of operation based at least in part on the route. The computer 105 may select the route based on operator input to a vehicle system, e.g., a navigation system, the HMI 120, etc., and/or the computer 105 and the server 140 may predict a route based on data stored in the data store 145 and/or the computer 105 memory, e.g., route data from prior travel, routes preferred by the operator, etc. Based on the selected route, typically including a consideration of characteristics of the route, such as types of roads, likely traffic density, etc., the computer 105 may determine the mode of operation for the vehicle 101.

A mode of operation is selected from a plurality of possible modes. For example in a fully autonomous mode, the vehicle 101 subsystems, e.g., brake systems, propulsion systems (e.g., throttle in a vehicle 101 powered by an internal combustion engine), and steering systems, etc., are controlled by the computer 105. In a partially autonomous mode, the computer 105 controls some, but not all, of the vehicle 101 subsystems, e.g., the computer 105 may control braking but not steering and propulsion, to take just one example. In a manual mode, vehicle 101 subsystems are controlled by a human operator rather than by the computer 105. The computer 105 may select a mode of operation by assessing a plurality of factors associated with a route, e.g., one or more characteristics of the selected route, e.g., whether the route is designed for autonomous and/or partially autonomous modes, etc., preferences of the operator, etc. Additionally or alternatively, the vehicle 101 computer 105 may be programmed to determine a route based at least in part on the mode of operation of the vehicle 101.

Example System

The vehicle 101 computer 105, which includes a processor and a memory as is known, may be communicatively coupled to, e.g., via a communications bus 125 or other known wired or wireless connections, or the computer 105 may include, one or more ECUs, e.g., controllers or the like included in the vehicle 101 for monitoring and/or controlling various vehicle 101 components, e.g., an engine control unit, transmission control unit, etc. The bus 125 may be a controller area network (CAN) bus and/or any other suitable in-vehicle communications bus such as JASPAR, LIN, SAE J1850, AUTOSAR, MOST, etc. Electronic control units may be connected to, e.g., a communications bus 125 such as a CAN bus, as is known. The vehicle 101 may also include one or more electronic control units that receive and transmit diagnostic information such as an onboard diagnostics (OBD-II) information. Via the CAN bus, OBD-II, and/or other wired or wireless mechanisms, the computer 105 may transmit messages to various devices in the vehicle 101 and/or receive messages from the various devices, e.g., controllers, actuators, etc. Alternatively or additionally, in cases in which the computer 105 actually comprises multiple devices, the CAN bus or the like may be used for communications between devices represented as the computer 105 in this disclosure, e.g., various ECUs.

The computer 105 may transmit and/or receive messages using a plurality of communication protocols, e.g., the computer 105 may include and/or be communicatively coupled to one or more transceivers as are known for providing such communications. For example, the computer 105 may transmit and/or receive messages using vehicle-to-vehicle protocols (V2V) such as Dedicated Short Range Communication (DSRC), cellular modem, and short-range radio frequency.

The computer 105 may further communicate with a network 130 that extends outside of the vehicle 101, e.g., communicating with the server 140. The network 130 may include various wired and/or wireless networking technologies, e.g., cellular, Bluetooth, wired and/or wireless packets, etc. The network 130 may have any suitable topology. Example communication networks include wireless communication networks (e.g., using Bluetooth, IEEE 802.11, etc.), local area networks (LAN), and/or wide area networks (WAN), including the Internet, providing data communication services.

The computer 105 memory may store map data, environmental data, and program instruction for determining one or more modes of operation of the vehicle 101. Additionally or alternatively, the computer 105 may similarly determine a route by evaluating the received environmental data and selected mode of operation, e.g., selected by operator input, etc., as explained further below.

Environmental data includes any environmental condition, e.g., weather conditions, traffic density, road incline, etc. The computer 105 may receive environmental data from sensors 115 and/or the server 140, e.g., such as GPS (global positioning system) data, weather conditions (such as outdoor temperature, presence or absence of precipitation, etc.)

road friction, traffic density (e.g., a number of vehicles within a length, e.g., 100 meters, of a road), road grade, etc. Some of the foregoing could also be indicated in the stored map data.

Further, an operator of the vehicle 101 may select a route to a specified destination (e.g., street address mapped to GPS coordinates in the map data). The computer 105 may compare the selected route, e.g., to an operator's home, to possible vehicle 101 modes of operation stored in the computer 105 memory. For example, the computer 105 may identify a mode of operation that was used in the past by the operator to traverse the selected route home and/or could evaluate environmental data to select a mode of operation.

Various modes of operation are possible in the context of the system 100. For example, the vehicle 101 may include one or more subsystems that the computer 105 is programmed to control via messages on the communications bus 125. Typically, such subsystems include propulsion (e.g., a powertrain in a vehicle 101 with an internal combustion engine), braking, and steering. Electronic control units (ECUs) or the like such as are known may be included in the vehicle 101 subsystems, and may receive messages from the computer 105 via the bus 125 to control the vehicle 101 subsystems, e.g., to accelerate the vehicle 101, apply break pressure, change a steering angle, etc. Based on a control state of one or more of the vehicle 101 subsystems, a mode of operation may be determined. For example, a vehicle 101 subsystem and/or features thereof may be assigned a control state of either "manual" or "automatic." In a manual control state, the vehicle 101 subsystem is controlled by a human operator. In the automatic control state, the vehicle 101 subsystem is controlled by the computer 105, i.e., according to execution of program instructions to provide messages via the bus 125 to an ECU associated with the subsystem.

A mode of operation may be determined according to respective control states of one, some, all, or none of a set of vehicle 101 subsystems. For example, a vehicle 101 mode of operation may be fully autonomous, such that the computer 105 operates as a virtual driver to control all vehicle 101 subsystems related to propulsion, braking, and steering (i.e. control states for all vehicle 101 systems are "autonomous." A mode of operation may be partially autonomous, such that some but not all subsystems related to propulsion, braking, and steering are controlled by the computer 105 and some but not all are controlled by the operator, i.e., one or more control states are "manual," and one or more control states are "automatic." A mode of operation may be manual, i.e., subsystems for each of propulsion, braking, and steering have "manual" control states.

The computer 105 may determine a vehicle 101 mode of operation for a selected route by evaluating map data and/or received environmental data, e.g., data from vehicle 101 sensors 115 and/or data received from the server 140, e.g., regarding precipitation intensity, type, etc., for one or more routes or route segments. The computer 105 may assign numeric values, i.e., scores or the like, to map data and the environmental data, e.g., such that precipitation conditions may correspond to a value, e.g., according to an intensity and/or type of precipitation, e.g., snow, rain, etc., a type of road may be assigned a value or score, e.g., interstate highway versus county road, versus dirt road, etc., traffic intensity may be assigned a value, etc. Known map data includes numeric classifications relating to road types that can be correlated with scores for a particular mode of vehicle 101 operation. Examples of such known map data include:

RoadName
FunctionClass
FromNode0—from links of the route, so we know the direction on the link we will expect to travel
LanesFrom0
LanesFrom1
TMCCode/Other traffic
Length (cm/m)
Height
Node0Position
Node1Position
ShapePoints
ExpectedSpeed
ADASSpeed
SpeedHistory
OneWay
RoadType
StopSign position (distance from 0)
TrafficLight position (distance from 0)
Elevation
Grade/Slope
HOV
Traffic Info
TPEG
Traffic light status
Surveillance
Traffic flow
Incident monitor
Traffic control
Speed limit control
Traffic light control.

Examples of known traffic data includes data according to the Traffic Protocol Experts Group (TPEG) and traffic light status data, e.g., as may be provided by V2V communications and/or from server 140. Traffic data can also include data obtained from surveillance cameras or the like, e.g., in communication with the server 140, to indicate traffic flow on a route segment, e.g., a number of vehicles passing a point per unit of time, e.g., per minute, as well as report on incidents such as collisions, temporary obstacles, lane closures, etc. Further, the computer 105 may receive, e.g., from the server 140, information about changing traffic control, e.g., speed limits, traffic light timing, etc.

Further, server 140 may provide traffic data that may be used to determine and/or modify a route, as is known; moreover, as disclosed herein, traffic data may be used to score a route or route segment for a particular mode of operation.

In any case, the values (i.e., scores) may then be used to compute a total operating score for a route. The total score may be used to determine which of the routes to actuate for a selected mode of operation and/or which of the mode of operations of the vehicle 101 to actuate for a selected route, e.g., based on pre-determined threshold values. Accordingly, a score to determine an operating mode for a route or route segment or to select a route or route segment based on an operating mode may be based on one, two, or more factors, e.g., a road type, traffic conditions, weather and other environmental states, road condition (e.g., potholes, ice, etc.), etc. As is known, route determination can be performed by evaluating route segments according to an objective function or functions. The operating score for a route can be provided as an input to the objective function(s). For example, the operating score may be a constraint on a route planning algorithm, e.g., only routes and/or route segments having an operating score above a predetermined minimum threshold may be selected. Alternatively, the route determination could be programmed to include maximizing the operating score, possibly subject to other constraints (e.g., time to travel route, type of road acceptable to vehicle 101 user, etc.).

The computer 105 may select a mode of operation according to a history for a selected route, as stated above, but also may evaluate environmental data for the selected route. For example, the computer 105 may determine to use full autonomous mode on the selected route during normal weather conditions (e.g., dry, temperature above freezing, full daylight available) and on an appropriate road (e.g., few curves, relatively flat grade, etc.), but may select partial autonomous control during certain abnormal conditions, e.g., lack of daylight and/or rain. Manual control could be required under yet further conditions, e.g., extreme traffic density, severe precipitation, very curvy road, etc.

Additionally or alternatively, the computer 105 may be programmed to determine a route based on a selected mode of operation. The environmental data and the selected mode of operation may be evaluated by the computer 105 to determine a route.

For example, if a possible route to a selected destination has an abnormally high traffic density, the computer 105 may identify a second route to the destination having a lower traffic density and in which the vehicle 101 computer may therefore use the fully autonomous mode of operation.

For further example, if a first route is selected by the vehicle 101 operator and the operator also selects a fully autonomous mode of operation, however, the computer 105 determines that the vehicle 101 subsystems should not operate in the fully autonomous mode of operation, the computer 105 may suggest alternative routes to the operator that are compatible with the fully autonomous mode of operation.

The vehicle 101 may include a variety of sensors 115. The sensors 115 may be linked to electronic control units or the like and operate within a CAN bus protocol or any other suitable protocol, as described above. The sensors 115 typically may both transmit and receive data such as measurements, commands, etc. The sensors 115 may communicate with the computer 105 or other electronic control unit via e.g., the CAN bus protocol, to process information transmitted from or received by the sensors 115. The sensors 115 may communicate with the computer 105 or other electronic control unit via any suitable wireless and/or wired manner. The sensors 115 may include, by way of example and not limitation, any assortment of a camera, a RADAR unit, a LADAR (also known as LIDAR) unit, a sonar unit, a motion detector, etc. Additionally, the sensors 115 may include a global positioning system (GPS) receiver that may communicate with a global positioning system satellite.

The vehicle 101 may include a human machine interface (HMI) 120. The HMI 120 may allow an operator of the vehicle 101 to interface with the computer 105, with electronic control units, etc. The HMI 120 may include any one of a variety of computing devices including a processor and a memory, as well as communications capabilities. The HMI 120 may be a portable computer, tablet computer, mobile phone, e.g., a smart phone, etc., that includes capabilities for wireless communications using IEEE 802.11, Bluetooth, and/or cellular communications protocols, etc. The HMI 120 may further include interactive voice response (IVR) and/or a graphical user interface (GUI), including e.g., a touch-screen or the like, etc. The HMI 120 may communicate with the network 130 that extends outside of the vehicle 101 and may communicate directly with the computer 105, e.g., using Bluetooth, etc. The computer 105 may prompt the operator of the vehicle 101 via the HMI 120 to choose a route or to actuate the vehicle 101 subsystems to traverse the route, as described further below.

The server 140 may include or be communicatively coupled to a data store 145. Data received from the computer 105 and/or the server 140 may be stored in the data store 145 for later retrieval. The data store 145 may include environmental data, routes, and modes of operation to be used by the server 140 to determine one of a route and a mode of operation for receipt by the vehicle 101 computer 105.

Example Process

Figure 2:
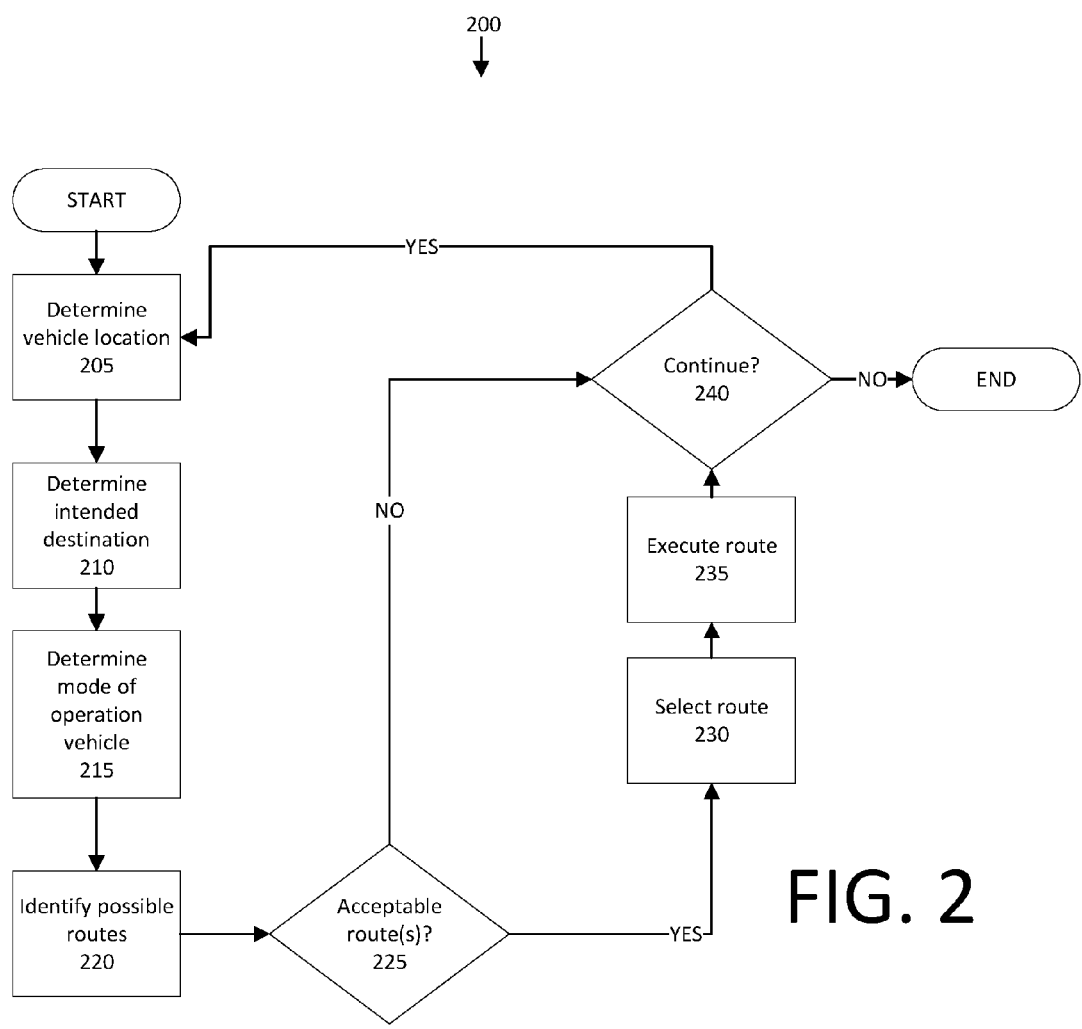
FIG. 2 is a diagram of an example process for determining a route based at least in part on a mode of operation.

FIG. 2 is a diagram of an example process 200 for determining a vehicle 101 route based at least in part on a current mode of vehicle 101 operation. The process 200 may be executed by the vehicle 101 computer 105.

The process 200 begins in a block 205 in which the vehicle 101 computer 105 determines the current vehicle 101 location, e.g., in a known manner. For example, the vehicle 101 computer 105 may receive measurements from the sensors 115, e.g., according to geo-coordinates utilizing GPS technology such as is known, etc., to determine the vehicle 101 location.

Next, in a block 210, the vehicle 101 determines a route end point, e.g., a user-specified destination and/or a destination predicted or determined by the computer 105, e.g., based at least in part on the vehicle 101 location and/or a history of driving from the current location of the vehicle 101 to the predicted destination, possibly taking into account time of day, day of week, etc.

Next, in a block 215, the vehicle 101 computer 105 determines the current vehicle 101 mode of operation, e.g., according to respective control states of vehicle 101 subsystems. For example, a memory of the computer 105 may store an indicator concerning whether the vehicle 101 is controlled fully autonomously, partially autonomously, and/or manually and/or the computer 105 may store respective control state indicators for vehicle 101 subsystems. The vehicle 101 mode of operation could be determined by user input, e.g., a setting via the HMI 120, by a default (e.g., manual), or in some other manner, and the computer 105 could store the setting and/or be executing programming to carry out full or partial control of the vehicle 101 (e.g., control of some or all vehicle 101 subsystems such as propulsion, steering, and braking).

Next, in a block 220, the vehicle 101 computer 105 identifies possible routes to traverse from the current location of the vehicle 101 to the determined destination. In general various manners of route determination, such as are known, may be used for determining one or more routes for a vehicle 101.

Next, in a block 225, the vehicle 101 computer 105 determines which of the identified possible routes are acceptable routes for the determined mode of operation. In determining whether a route is acceptable for a mode of operation, the computer 105 may consider current vehicle 101 conditions, e.g., fuel level, tire pressure, etc., environmental data, e.g., presence or absence of precipitation, outside temperature, etc., road conditions and/or characteristics, e.g., bumpiness, estimated road friction, number of lanes, curviness (e.g., number of degrees of turning required over a predetermined distance), etc.

In general, in identifying acceptable routes, the computer 105 may consider the availability and accuracy of sensors 115. For example, fully autonomous and/or partial autonomous modes may demand higher degrees of accuracy, or may require availability of one or more sensors 115 or other equipment (e.g., a cellular modem or the like to provide communication with, and allow receipt of data from, the server 140, ability for Dedicated Short Range Communications and/or other vehicle-to-vehicle communications, etc.). Equipment that may be so evaluated includes front looking camera, a rear looking camera, a side looking camera, front radar, back radar, side radar, a front ultrasonic sensor, a rear ultrasonic sensor, lidar, GPS, and/or a modem or other communications device, and the computational capability of the computer 105 (e.g., amount of memory, processing speed, etc.).

Additionally or alternatively, in the block 225, the vehicle 101 computer 105 may determine that there are no available routes based on the current location, the specified destination, and the current mode of operation. If the vehicle 101 computer 105 determines that there are no available routes that correspond to the computer 105 received inputs, the process 200 proceeds to a block 240 described further below.

The computer 105 may rank the determined acceptable routes for the determined mode. For example, the routes may be ranked according to a score or the like in which more acceptable routes, i.e., routes better suited to the determined mode, are ranked ahead of the less acceptable routes, e.g., as determined by the score. For example, the computer 105 may display a ranking based on routes ordered alphabetically, based on a frequency of the operator traversing the route, based on time of day, etc. The vehicle 101 computer may display the ranking to the operator, e.g., via the HMI 120, under a "Favorites" heading, for example.

For example, if a first route is less suitable for fully autonomous driving than a second route, and the operator has selected a fully autonomous mode of operation, the computer 105 may promote in rank the second route over the first route. For further example, if a first route has greater traffic than a second route, the computer 105 may promote the second route over the first route.

Next, in a block 230, either of the vehicle 101 computer 105 or the vehicle 101 operator selects the route. The operator may select the route by input to the HMI 120. The computer 105 may select the route by receiving permission to traverse a route selected by the computer 105 and/or selecting a route without operator input, e.g., according to a highest-ranked route for the current mode of operation. For example, the computer 105 may be programmed to select the highest-ranked route when the operator selects the full autonomous mode of operation.

Next, in a block 235, the vehicle 101 executes the route determined by the process 200, depending on the current mode of operation. For example, in a manual mode, the computer 105 could cause the route to be displayed, provide turn-by-turn navigation instructions as are known, etc. In an autonomous or semi-autonomous mode, the computer 105 could send and receive data via the communications bus 125 and to and from the vehicle 101 ECUs to control one or more of the vehicle 101 subsystems, including propulsion, steering, and/or braking, to cause the vehicle 101 to travel the route.

Next, or following the block 220, the vehicle 101 computer 105, in the block 240, determines if the process 200 should continue. For example, the process 200 may end if the operator of the vehicle 101 ends the process 200, if the vehicle 101 is switched off, etc. In any case, if the process 200 should not continue, the process 200 ends following the block 240. Otherwise, the process 200 returns to the block 205; alternatively, after the block 240, the computer 105 could proceed to execute the process 300, described below. When the process 200 returns to the block 205 for a second or subsequent iteration, a route of the vehicle 101 accordingly may be modified or replaced according to a change in the vehicle 101 mode of operation.

Figure 3:
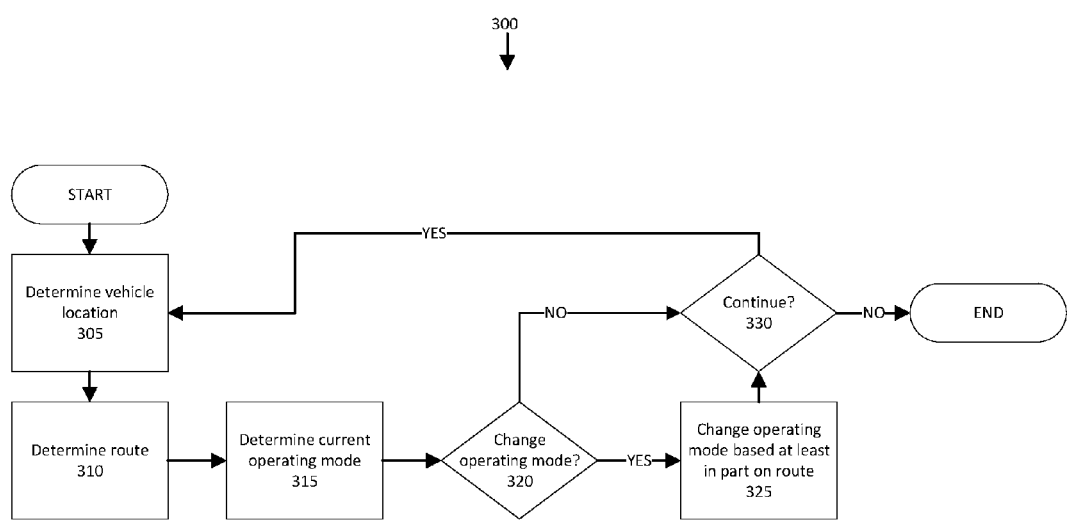
FIG. 3 is a diagram of an example process for determining a vehicle mode of operation based at least in part on a route.

FIG. 3 is a diagram of an example process 300 for determining a vehicle mode of operation based at least in part on a route. The process 300 begins in a block 305, in which the computer 105 determines a location of the vehicle 101, e.g., as described above.

Next, in a block 310, the computer 105 determines a route being traversed or selected to be traversed by the vehicle 101. For example, the computer 105 could receive input from an operator concerning a destination, could determine a destination according to historical data compared to time of day, day of week, location, etc., as described above, the computer 105 could receive input concerning a specified route from the operator, etc. As discussed above, various ways of determining and selecting a vehicle 101 route are known.

Next, in a block 315, the computer 105 determines a current operating mode of the vehicle 101, e.g., as described above, the computer 105 memory may store a setting or indicator concerning a current operating mode, a vehicle 101 may default to an operating mode, e.g., manual, on being powered on, etc.

Next, in a block 320, the computer 105 determines whether to change the operating mode of the vehicle 101. For example, as discussed above, the computer 105 may determine programming to score a suitability or acceptability of a route for an operating mode. Accordingly, if such score exceeds a predetermined threshold, then the computer 105 may determine not to change the current operating mode. However, if such score falls below a predetermined threshold and/or a route is otherwise determined to be not acceptable for an operating mode, then the computer 105 may determine to change the current operating mode.

In a block 325, which may follow the block 320, the computer 105 changes the vehicle 101 operating mode at least in part based on an operating mode determined to be acceptable for the selected route. For example, the computer 105 could be programmed to select an operating mode in which the vehicle 101 performs at a highest level of autonomy possible for the route. For example, the vehicle 101 could have been operating in a full autonomous mode, wherein the selected route is suitable for at most a partial autonomous mode, e.g., in which the vehicle 101 computer 105 controls vehicle 101 braking and propulsion, but not steering. Alternatively, the computer 105 could be programmed to select an operating mode for which the route has a highest score. That is, the selected route could be acceptable, e.g., have a score for a partial autonomous mode above a predetermined threshold, but have a highest score for a fully manual mode, in which case the computer 105 could be programmed to select the fully manual mode.

In the block 330, which may follow either of the blocks 324 325, the computer 105 determines whether the process 300 should continue, e.g., in a manner described above with respect to the block 240 above. Accordingly, the process 300 may continue in the block 305, or end, according to the determination of the block 330. Thus, when the process 300 visits the block 305 a second or subsequent time, the vehicle 101 mode of operation may be changed according to changes in a route and/or changes in operating conditions associated with a route.

CONCLUSION

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method, comprising:
   identifying, as one of automatic and manual, respective control states of each of a plurality of vehicle subsystems that include braking, steering, and propulsion;
   determining a vehicle operating mode according to the control states, wherein the operating mode is manual control where all control states are manual, partial manual control where one control state is manual and one control state is automatic, and no manual control where all control states are automatic; and
   determining a route for the vehicle and operating the vehicle on the determined route based in part on the operating mode.

2. The method of claim 1, wherein determining the route includes identifying at least one route feature that is appropriate for at least one of the control states.

3. The method of claim 2, wherein the at least one route feature includes a type of road, a type of terrain, a speed limit, a predicted traffic density, and one or more predicted vehicle maneuvers.

4. The method of claim 1, further comprising traversing a portion of the route and then modifying the route according to a detected change in the operating mode.

5. The method of claim 1, further comprising traversing a portion of the route and then changing the mode of operation.

6. A system, comprising a computer having a processor and a memory, the memory storing instructions executable by the processor such that the computer is programmed to:
   identify, as one of automatic and manual, respective control states of each of a plurality of vehicle subsystems that include braking, steering, and propulsion;
   determine a vehicle operating mode according to the control states, wherein the operating mode is manual control where all control states are manual, partial manual control where one control state is manual and one control state is automatic, and no manual control where all control states are automatic; and
   determine a route for the vehicle and operate the vehicle on the determined route based in part on the operating mode.

7. The system of claim 6, wherein determining the route includes identifying at least one route feature that is appropriate for at least one of the control states.

8. The system of claim 7, wherein the at least one route feature includes a type of road, a type of terrain, a speed limit, a predicted traffic density, and one or more predicted vehicle maneuvers.

9. The system of claim 6, further wherein the computer is further programmed to, after a portion of the route is traversed, modify the route according to a detected change in the operating mode.

10. The system of claim 6, further wherein the computer is further programmed to, after a portion of the route is traversed, changing the mode of operation.

11. A system, comprising a computer having a processor and a memory, the memory storing instructions executable by the processor such that the computer is programmed to:
    identify a route for a vehicle;
    identify, as one of automatic and manual, respective control states of each of a plurality of vehicle subsystems that include braking, steering, and propulsion;
    based at least in part on the route, determine a vehicle operating mode according to the control states, wherein the operating mode is manual control where all control states are manual, partial manual control where one control state is manual and one control state is automatic, and no manual control where all control states are automatic; and
    operate the vehicle on the route.

12. The system of claim 11, wherein determining the route includes identifying at least one route feature that is appropriate for at least one of the control states.

13. The system of claim 12, wherein the at least one route feature is determined according to a type of road, a type of terrain, a speed limit, a predicted traffic density, and one or more predicted vehicle maneuvers.

14. The system of claim 11, further wherein the computer is further programmed to, after a portion of the route is traversed, modify the route according to a detected change in the operating mode.

15. The system of claim 11, further wherein the computer is further programmed to, after a portion of the route is traversed, change the mode of operation.

\* \* \* \* \*